United States Patent
Raman et al.

(10) Patent No.: US 11,902,781 B2
(45) Date of Patent: Feb. 13, 2024

(54) METHODS AND SYSTEMS OF WIRELESS SENSOR AUTHENTICATION

(71) Applicant: Nile Global, Inc., San Jose, CA (US)

(72) Inventors: Gopal Raman, San Jose, CA (US); Suresh Katukam, Milpitas, CA (US); Promode Nedungadi, San Jose, CA (US); Sathish Damodaran, San Jose, CA (US); Tjandra Trisno, San Jose, CA (US); Avinash Kumar, San Ramon, CA (US); Steve Alexander, Woodside, CA (US)

(73) Assignee: NILE GLOBAL, INC., San Jose, CA (US)

( * ) Notice: Subject to any disclaimer, the term of this patent is extended or adjusted under 35 U.S.C. 154(b) by 0 days.

(21) Appl. No.: 18/084,388

(22) Filed: Dec. 19, 2022

(65) Prior Publication Data
US 2023/0118790 A1    Apr. 20, 2023

Related U.S. Application Data

(63) Continuation of application No. 17/314,016, filed on May 6, 2021, now Pat. No. 11,533,615.

(51) Int. Cl.
| | |
|---|---|
| *H04L 9/32* | (2006.01) |
| *H04W 12/06* | (2021.01) |
| *H04L 9/40* | (2022.01) |
| *H04W 12/041* | (2021.01) |
| *H04W 12/03* | (2021.01) |
| *H04L 9/08* | (2006.01) |
| *H04W 88/08* | (2009.01) |
| *H04W 84/18* | (2009.01) |

(52) U.S. Cl.
CPC ............ *H04W 12/06* (2013.01); *H04L 9/085* (2013.01); *H04L 9/0819* (2013.01); *H04L 9/0897* (2013.01); *H04L 9/3247* (2013.01); *H04L 9/3268* (2013.01); *H04L 63/0869* (2013.01); *H04L 63/166* (2013.01); *H04W 12/03* (2021.01); *H04W 12/041* (2021.01); *H04W 84/18* (2013.01); *H04W 88/08* (2013.01)

(58) Field of Classification Search
CPC ... H04W 12/06; H04W 12/03; H04W 12/041; H04W 84/18; H04W 88/08; H04L 9/0819; H04L 9/085; H04L 9/0897; H04L 9/3247; H04L 9/3268; H04L 63/0869; H04L 63/166
See application file for complete search history.

(56) References Cited

U.S. PATENT DOCUMENTS

| | | | |
|---|---|---|---|
| 2003/0138105 A1* | 7/2003 | Challener | ................ H04L 9/14 380/277 |
| 2018/0199205 A1* | 7/2018 | Zhu | ...................... H04L 9/0825 |

OTHER PUBLICATIONS

International Search Report and Written Opinion for PCT/US2022/028194 dated Jul. 5, 2022; 7 pgs.

* cited by examiner

*Primary Examiner* — Izunna Okeke
(74) *Attorney, Agent, or Firm* — Loza & Loza, LLP

(57) ABSTRACT

Embodiments of a device and method are disclosed. In an embodiment, a method of communications involves from a wireless sensor deployed at a customer site, connecting to a wireless access point (AP) deployed at the customer site and based on a private key stored in the wireless sensor, performing mutual authentication between the wireless sensor and an authentication server connected to the wireless AP.

17 Claims, 10 Drawing Sheets

METHODS AND SYSTEMS OF WIRELESS SENSOR AUTHENTICATION

CROSS REFERENCE TO RELATED APPLICATIONS

This application is a continuation of U.S. application Ser. No. 17/314,016, filed on May 6, 2021, the contents of which are incorporated by reference herein.

BACKGROUND

A sensor can be used to monitor a network and perform both active and passive testing of the network. For example, a wireless sensor can be used to monitor a wireless network and perform both active and passive testing of the wireless network. Typically, a wireless network (e.g., WiFi) vendor or service provider installs sensors to monitor the health of a wireless network, which may include Access Points (APs), switches, and other network elements that work together to provide a customer with wireless access. For example, a sensor may behave similarly to a client of a WiFi network and check the health and performance of the WiFi network and report collected data for analysis. However, sensors such as wireless sensors may be susceptible to Man-in-the-Middle (MITM) attacks, which allows an attacker to gain knowledge of an encryption key. Once an encryption key is compromised, an attacker can decrypt traffic and/or alter and inject traffic. Therefore, there is a need for sensor and authentication technology that is resilient to MITM attacks.

SUMMARY

Embodiments of a device and method are disclosed. In an embodiment, a method of communications involves from a wireless sensor deployed at a customer site, connecting to a wireless access point (AP) deployed at the customer site and based on a private key stored in the wireless sensor, performing mutual authentication between the wireless sensor and an authentication server connected to the wireless AP. Other embodiments are described.

In some embodiments, the method further includes deriving an encryption key for communications between the wireless sensor and the wireless AP in response to the mutual authentication.

In some embodiments, the method further includes at the wireless sensor deployed at the customer site, conducting wireless communications with the wireless AP using the encryption key.

In some embodiments, deriving the encryption key for communications between the wireless sensor and the wireless AP in response to the mutual authentication includes deriving the encryption key for communications between the wireless sensor and the wireless AP in response to a shared secret generated as a result of the mutual authentication.

In some embodiments, the method further includes transmitting the shared secret from the authentication server to the wireless AP.

In some embodiments, the shared secret includes a Pre-Master Key (PMK).

In some embodiments, the encryption key includes a Pairwise Transient Key (PTK).

In some embodiments, the private key is stored in a Trusted Platform Module (TPM) of the wireless sensor.

In some embodiments, based on the private key stored in the wireless sensor, performing the mutual authentication between the wireless sensor and the authentication server connected to the wireless AP includes based on the private key stored in the wireless sensor, performing the mutual authentication between the wireless sensor and the authentication server connected to the wireless AP using a Transport Layer Security (TLS) protocol where a TLS client is the wireless sensor.

In some embodiments, based on the private key stored in the wireless sensor, performing the mutual authentication between the wireless sensor and the authentication server connected to the wireless AP includes exchanging a server certificate, a server signature, a client certificate, and a client signature between the wireless sensor and the authentication server.

In some embodiments, based on the private key stored in the wireless sensor, performing the mutual authentication between the wireless sensor and the authentication server connected to the wireless AP includes from the wireless sensor, transmitting a client message to the authentication server, at the wireless sensor, receiving a server message, a server certificate, and a server signature from the authentication server in response to the client message, at the wireless sensor, verifying the server signature, and from the wireless sensor, transmitting a client certificate to the authentication server when the server signature is successfully verified.

In some embodiments, based on the private key stored in the wireless sensor, performing the mutual authentication between the wireless sensor and the authentication server connected to the wireless AP further includes transmitting a signature request to a TPM of the wireless sensor in which the private key is stored and receiving a client signature from the TPM of the wireless sensor, wherein the client signature is generated based on the private key.

In some embodiments, based on the private key stored in the wireless sensor, performing the mutual authentication between the wireless sensor and the authentication server connected to the wireless AP further includes from the wireless sensor, transmitting the client signature to the authentication server and at the authentication server, verifying the client signature.

In some embodiments, a wireless sensor deployed at a customer site includes a wireless transceiver configured to connect to a wireless AP deployed at the customer site and a controller configured to store a private key and to, based on the private key, perform mutual authentication with an authentication server connected to the wireless AP.

In some embodiments, the controller is further configured to derive an encryption key for communications between the wireless sensor and the wireless AP in response to the mutual authentication.

In some embodiments, the controller is further configured to conduct wireless communications with the wireless AP using the encryption key.

In some embodiments, the controller includes a TPM configured to store the private key.

In some embodiments, the controller includes a TLS unit configured to, based on the private key stored in the wireless sensor, perform the mutual authentication with the authentication server connected to the wireless AP using a TLS protocol where a TLS client is the wireless sensor.

In some embodiments, the controller includes a cryptographic engine configured to receive a message digest and generate a client signature of the message digest based on the private key.

In some embodiments, a method of communications involves from a wireless sensor deployed at a customer site, connecting to a wireless AP deployed at the customer site, based on a private key stored in a TPM of the wireless sensor, performing mutual authentication between the wireless sensor and an authentication server connected to the wireless AP, deriving a PTK for communications between the wireless sensor and the wireless AP in response to a PMK generated as a result of the mutual authentication, and at the wireless sensor deployed at the customer site, conducting wireless communications with the wireless AP using the PTK.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
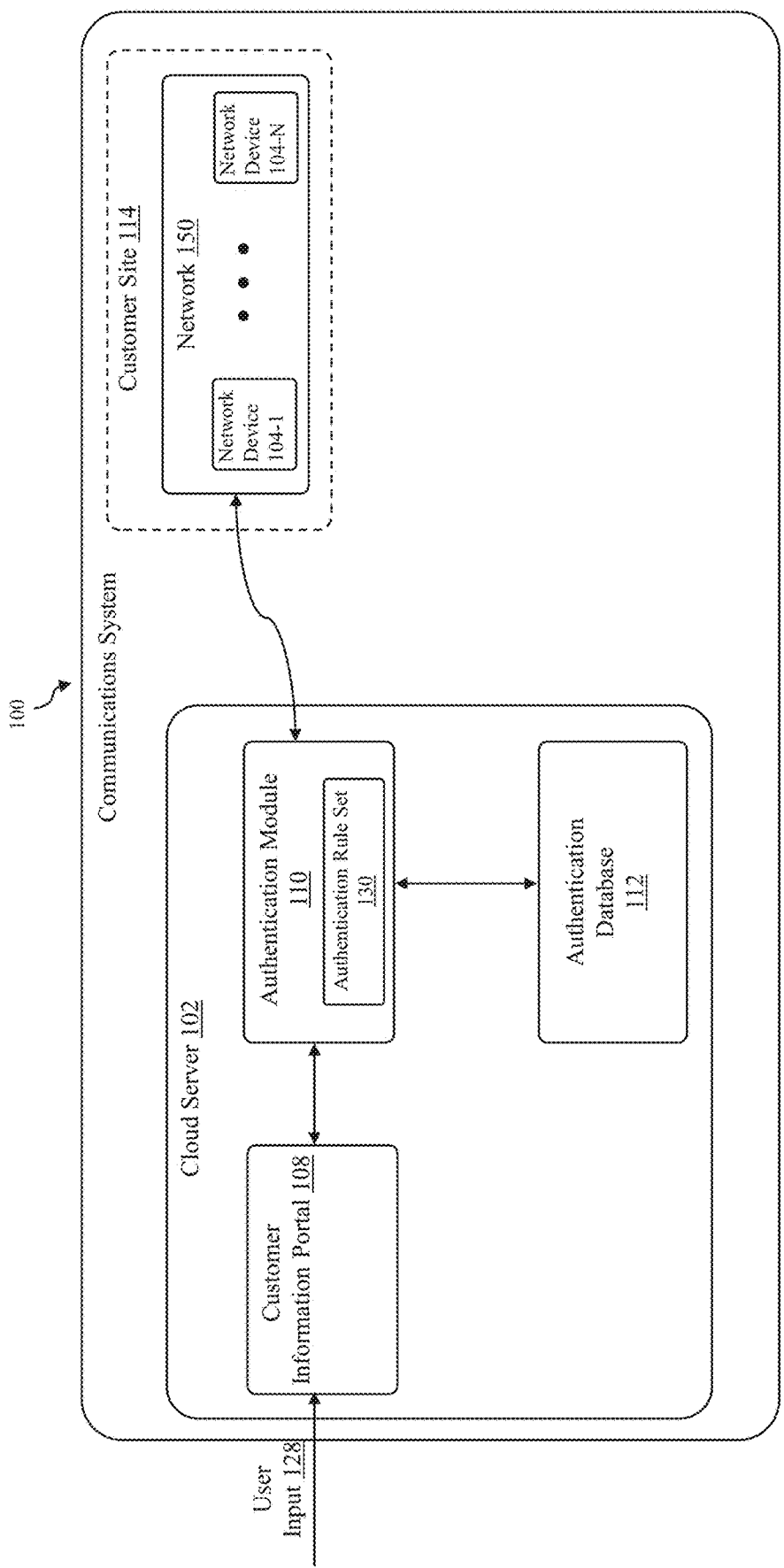
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and a deployed network 150 within a customer site 114. The cloud server and/or the network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a security service (e.g., an authentication service) to network devices (e.g., the deployed network 150) at the customer site. Because the cloud server can facilitate or perform a security service to network devices at the customer site, network security can be improved. In addition, because the cloud server can facilitate or perform a security service to network devices at the customer site, a user or customer of the customer site can be notified of security issues. In some embodiments, the cloud server is configured to generate a user interface to obtain user input information regarding network security in a floor plan of a customer site. In some embodiments, the user interface includes a graphical user interface. The cloud server may be implemented in hardware (e.g., circuits), software, firmware, or a combination thereof. In some embodiments, the cloud server is implemented on a server grade hardware platform, such as an x86 architecture platform. For example, the hardware platform of the cloud server may include conventional components of a computing device, such as one or more processors (e.g., CPUs), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes an authentication module 110, a customer information portal 108 connected to the authentication module 110, and an authentication database 112 configured to store authentication data. The authentication module, the customer information portal, and/or the authentication database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one authentication module, more than one customer information portal, and/or more than one authentication database. In another example, although the authentication module, the customer information portal, and the authentication database are shown in FIG. 1 as being connected in certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the server. In some embodiments, the authentication module 110 is configured to facilitate or perform an authentication service to network devices (e.g., the deployed network 150) at the customer site 114, for example, using an authentication rule set 130. The authentication rule set 130 may include one or more authentication rules for network devices at the customer site 114, for example, for performing an authentication service to network devices at the customer site 114. In some embodiments, the authentication database 112 is configured to store authentication data for a network deployed and/or to be deployed at the customer site (e.g., a list of network devices deployed or to be deployed at the customer site). Because the authentication module can facilitate or perform an authentication service to network devices at the customer site, network security can be improved. In addition, because the authentication module can facilitate or perform an authentication service to network devices at the customer site, a user or customer (e.g., a layperson such as a worker on-site or an end-user such as an employee) at the customer site can be notified of authentication issues. The customer information portal 108 is configured to receive customer input 128. In some embodiments, the customer information portal is configured to include or generate a user interface that allows a customer to input information associated with an authentication service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N may be compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one authentication server, at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a wireless sensor, a laptop, a desktop personal computer (PC), a mobile phone, or other wireless device that supports at least one WLAN communications protocol (e.g., an IEEE 802.11 protocol)).

Figure 2:
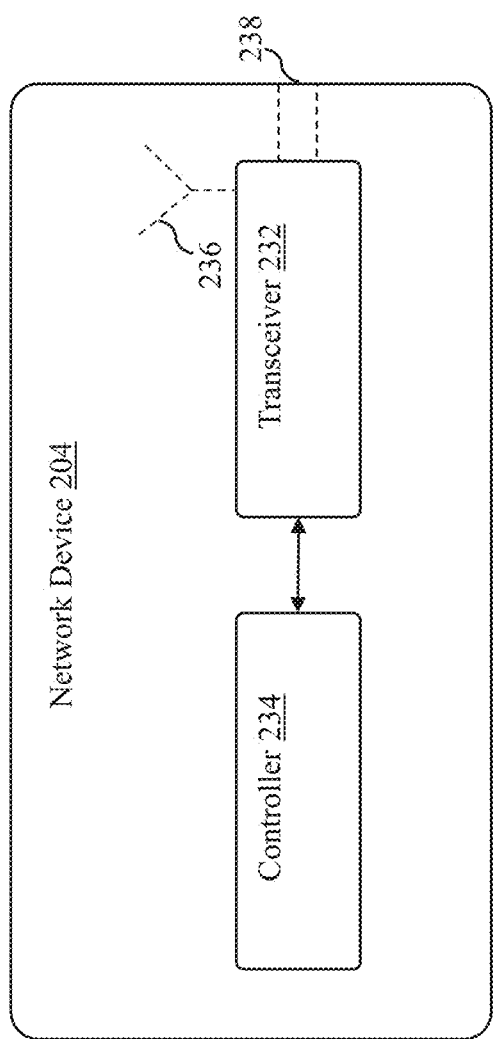
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device that is included in the deployed network 150 depicted in FIG. 1.

However, network devices that can be included in the deployed network 150 depicted in FIG. 1 are not limited to the embodiment depicted in FIG. 2. The network device 204 may be any suitable type of network device. For example, the network device 204 may be an authentication server, a distribution switch, a gateway, an access switch, a wireless access point, or a sensor, described in details with reference to FIG. 2. In the embodiment depicted in FIG. 2, a network device 204 includes a wireless and/or wired transceiver 232, a controller 234 operably connected to the transceiver 232, at least one optional antenna 236 operably connected to the transceiver 232, and at least one optional network port 238 operably connected to the transceiver 232. In some embodiments, the transceiver 232 includes a physical layer (PHY) device. The transceiver 232 may be any suitable type of transceiver. For example, the transceiver 232 may be a short-range communications transceiver (e.g., a Bluetooth) or a WLAN transceiver (e.g., a transceiver compatible with an IEEE 802.11 protocol). In some embodiments, the network device 204 includes multiple transceivers, for example, a short-range communications transceiver (e.g., a Bluetooth) and a WLAN transceiver (e.g., a transceiver compatible with an IEEE 802.11 protocol). In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to perform an authentication function for the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a DS, a HE or gateway, an AS, a wireless AP, or a wireless sensor that wirelessly connects to a wireless AP.

Figure 3:
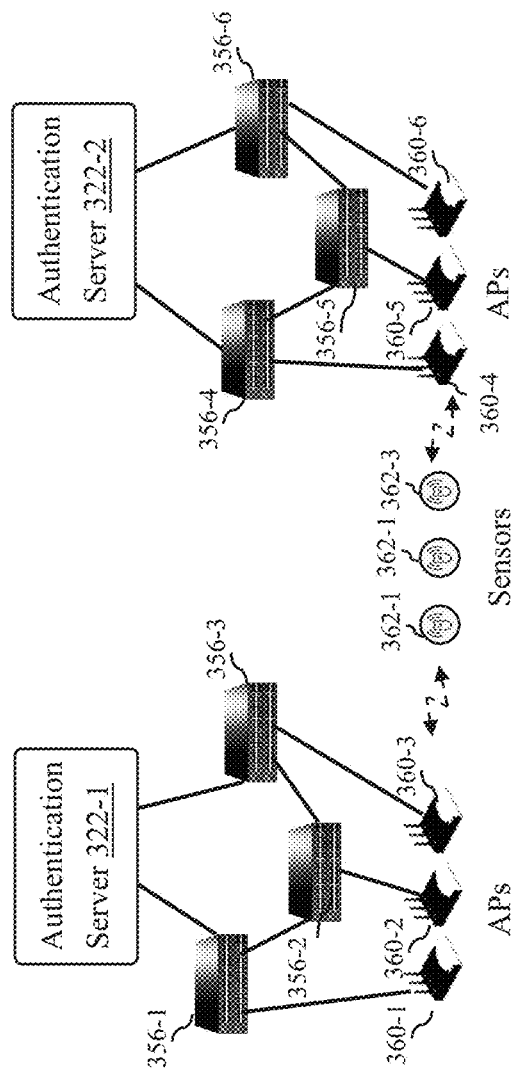
FIG. 3 depicts an embodiment of a network that can be deployed at a customer site.

FIG. 3 depicts an embodiment of a network 350 that can be deployed at the customer site 114. The network 350 depicted in FIG. 3 is one possible embodiment of the deployed network 150 at the customer site 114 depicted in FIG. 1. However, the deployed network 150 at the customer site 114 depicted in FIG. 1 are not limited to the embodiment shown in FIG. 3. In some embodiments, the network 350 is a replicable block that can be scaled (e.g., expanded) to meet any deployment. In the embodiment depicted in FIG. 3, the network 350 includes a pair of local authentication servers 322-1, 322-2, a number of access switches (ASs) 356-1, 356-2, 356-3, 356-4, 356-5, 356-6 that can directly interact with lower-level devices (e.g., wireless APs), a number of wireless APs 360-1, 360-2, 360-3, 360-4, 360-5, 360-6 connected to the ASs, and a number of wireless sensors 362-1, 362-2, 362-3 that wirelessly connect to the wireless APs. In some embodiments, at least one of the authentication servers 322-1, 322-2, the ASs 356-1, 356-2, 356-3, 356-4, 356-5, 356-6, the wireless APs 360-1, 360-2, 360-3, 360-4, 360-5, 360-6, and the wireless sensors 362-1, 362-2, 362-3 depicted in FIG. 3 is implemented as the network device 204 depicted in FIG. 2. In some embodiments, at least one of the authentication servers 322-1, 322-2 is implemented the same as or similar to the cloud server 102 depicted in FIG. 1. For example, at least one of the authentication servers 322-1, 322-2 includes an authentication module and an authentication database configured to store authentication data, which may be implemented in hardware (e.g., circuits), software, firmware, or a combination thereof. In some embodiments, the authentication module is configured to facilitate or perform an authentication service to the wireless sensors 362-1, 362-2, 362-3, for example, using an authentication rule set, which may include one or more authentication rules.

In some embodiments, at least one wireless sensor (e.g., the wireless sensor 362-1, 362-2, or 362-3) is installed in the customer site 114 to monitor the network 150 and perform both active and passive testing of the network 150. For example, at least one wireless sensor behaves similarly to a client of a wireless network, checks the health and performance of the wireless network, and reports collected data for analysis. The at least one wireless sensor can be plugged directly into at least one wall power outlet and can be installed at ground level thus mimicking at least one real client device. In some embodiments, multiple wireless sensors are installed across the deployed network 150 (e.g., the network 350 depicted in FIG. 3) using a mobile app and connect seamlessly to at least one wireless AP to communicate with the cloud server 102 (e.g., the authentication module 110 in the cloud server 102) and/or a local authentication server at the customer site (e.g., the authentication server 322-1 or 322-2).

Figure 4:
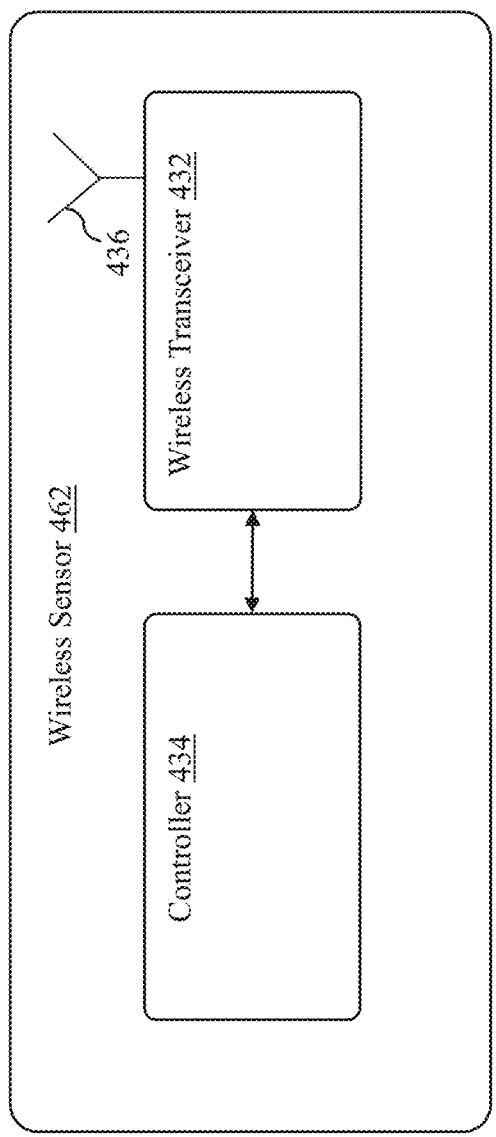
FIG. 4 depicts an embodiment of a wireless sensor that can be installed in the customer site to monitor the health and performance of a wireless network at the customer site.

FIG. 4 depicts an embodiment of a wireless sensor 462 that can be installed in the customer site 114 to monitor the health and performance of a wireless network at the customer site 114. The wireless sensor 462 depicted in FIG. 4 is one possible embodiment of wireless sensors (e.g., the wireless sensor 362-1, 362-2, or 362-3) that can be installed at the customer site 114 depicted in FIG. 1. However, wireless sensors that can be installed at the customer site 114 depicted in FIG. 1 are not limited to the embodiment shown in FIG. 4. In the embodiment depicted in FIG. 4, the wireless sensor 462 includes a wireless transceiver 432, a controller 434 operably connected to the wireless transceiver 432, and at least one antenna 436 operably connected to the wireless transceiver 432. The wireless transceiver 432 may be any suitable type of transceiver. For example, the wireless transceiver 432 may be a short-range communications transceiver (e.g., a Bluetooth) or a WLAN transceiver (e.g., a transceiver compatible with an IEEE 802.11 protocol). In some embodiments, the wireless sensor 462 includes multiple wireless transceivers, for example, a short-range communications transceiver (e.g., a Bluetooth) and a WLAN transceiver (e.g., a transceiver compatible with an IEEE 802.11 protocol). In some embodiments, the controller 434 is configured to control the wireless transceiver 432 to process packets received through the antenna 436 and/or to generate outgoing packets to be transmitted through the antenna 436. In some embodiments, the controller 434 is configured to perform an authentication function. The antenna 436 may be any suitable type of antenna. For example, the antenna 436 may be an induction type antenna such as a loop antenna or any other suitable type of induction type antenna. However, the antenna 436 is not limited to an induction type antenna.

In some embodiments, to protect the integrity of data collected by the wireless sensor 462 as well as prevent the wireless sensor 462 from being compromised by rogue actors, the wireless sensor 462 authenticates to an authentication server using a high grade of network security, which rules out un-encrypted connections and reliance on pre-configured shared secrets since these are known to be vulnerable. In some embodiments, the wireless sensor 462 is configured to implement an enterprise grade security mechanism built on an 802.1X framework that allows the use of certificate based mutual authentication between the wireless sensor 462 and an authentication server. In some embodiments, the wireless transceiver 432 is configured to connect to a wireless access point (AP) deployed at a customer site and the controller 434 is configured to store a private key and to, based on the private key, perform mutual authentication with an authentication server connected to the wireless AP. In some embodiments, the controller 434 is further configured to derive an encryption key for communications between the wireless sensor and the wireless AP in response to the mutual authentication. In some embodiments, the controller 434 is further configured to conduct wireless communications with the wireless AP using the encryption key. In some embodiments, the controller 434 includes a Trusted Platform Module (TPM) configured to store the private key. In some embodiments, the controller 434 includes a Transport Layer Security (TLS) unit configured to, based on the private key stored in the wireless sensor, perform the mutual authentication with the authentication server connected to the wireless AP using a Transport Layer Security (TLS) protocol where a TLS client is the wireless sensor. In some embodiments, the controller 434 includes a cryptographic engine 580 configured to receive a message digest from the TLS unit 572 and to generate a client signature of the message digest based on the private key 578 stored in the TPM 570.

Figure 5:
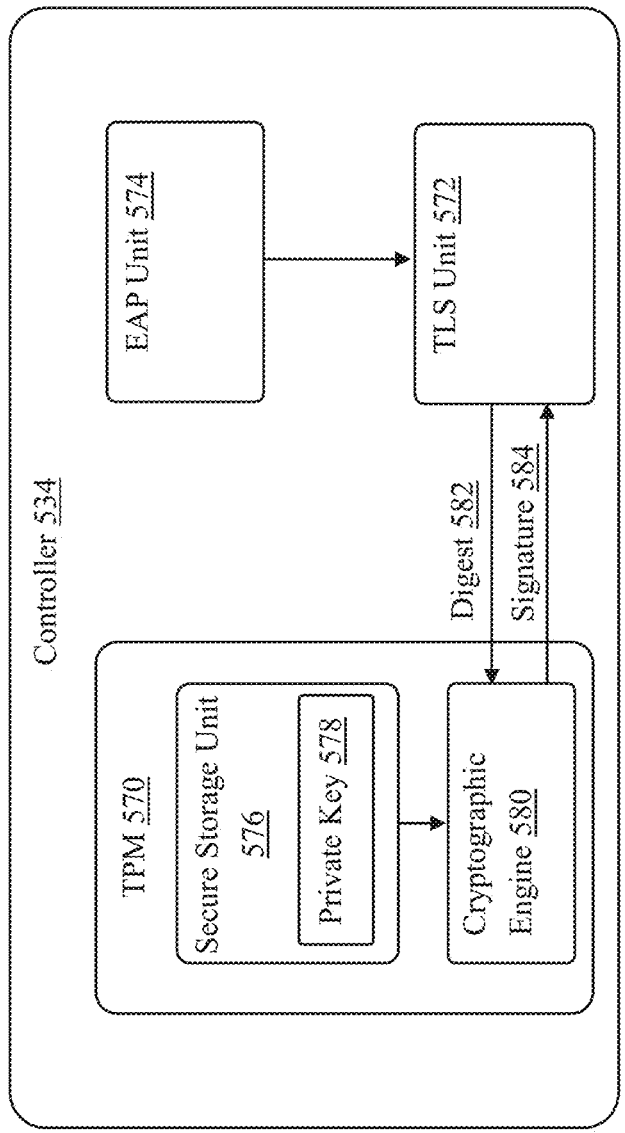
FIG. 5 depicts a controller, which is an embodiment of a controller of the wireless sensor depicted in FIG. 4.

FIG. 5 depicts a controller 534, which is an embodiment of the controller 434 of the wireless sensor 462 depicted in FIG. 4. The controller 534 depicted in FIG. 5 is one possible embodiment of the controller 434 of the wireless sensor 462 depicted in FIG. 4. However, the controller 434 of the wireless sensor 462 depicted in FIG. 4 is not limited to the embodiment shown in FIG. 5. In the embodiment depicted in FIG. 5, the controller 534 includes a Trusted Platform Module (TPM) 570, a Transport Layer Security (TLS) unit 572 operably connected to the TPM 570, and an Extensible Authentication Protocol (EAP) unit 574 operably connected to the TLS unit 572 and configured to perform an EAP function.

In some embodiments, the controller 534 is configured to store a private key and to, based on the private key, perform mutual authentication with an authentication server connected to a wireless AP. In some embodiments, the controller 534 is further configured to derive an encryption key for communications between the wireless sensor and a wireless AP in response to the mutual authentication. In some embodiments, the controller 534 is further configured to conduct wireless communications with the wireless AP using the encryption key. In some embodiments, the controller 434 includes a cryptographic engine configured to receive a message digest and generate a client signature of the message digest based on the private key. The TLS unit 572 is configured to interact with the TPM 570 to perform operations that require the private key 578. In some embodiments, the TLS unit 572 is configured to, based on the private key stored in the wireless sensor, perform a mutual authentication with an authentication server connected to a wireless AP using a TLS protocol where a TLS client is the wireless sensor. The TPM 570 includes a secure storage unit 576 that is configured to store a private key 578 and a cryptographic engine 580 that is configured to perform cryptographic operations. For example, the TLS unit 572 transmits a digest 582 to the cryptographic engine 580 and receives a signature 584 from the cryptographic engine 580. In some embodiments, the cryptographic engine is configured to receive a message digest and to generate a client signature of the message digest based on the private key stored in the TPM 570.

The controller 534 uses an EAP scheme (e.g., implemented in the EAP unit 574) that is based on a TLS suite (e.g., implemented in the TLS unit 572), which may require the use of both client and server certificates. By using the controller 534, a wireless sensor (e.g., the wireless sensor 462) is resilient to a Man-in-the-Middle (MITM) attack, which allows an attacker to gain knowledge of an encryption key derived between the wireless sensor 462 and the network 150. Once an encryption key is compromised, an attacker can decrypt traffic and/or alter and inject traffic. However, for an MITM attack to succeed, an attacker needs the private key 578 that is stored in the TPM 570. Because the private key 578 is stored in the secure storage unit 576 of the TPM 570, MITM attacks become infeasible. In some embodiments, the TPM 570 is a tamper proof hardware (e.g., a tamper proof IC chip) that performs operations using the private key 578 without revealing the private key 578 to outside entities. In some embodiments, the TPM is replaced by a hardware security module (HSM). By using the controller 534, a wireless sensor (e.g., the wireless sensor 462) is also resilient to impersonation. In some embodiments, the certificate stored in a wireless sensor (e.g., the wireless sensor 462) is unique to the wireless sensor and is, for example, tied to the serial number and other unique identity of the wireless sensor, such as the Ethernet MAC address of the wireless sensor. Impersonating the wireless sensor requires an attacker to gain access the private key 578. By storing the private key 578 in the TPM 570, impersonation attacks become more difficult or even infeasible.

Figure 6:
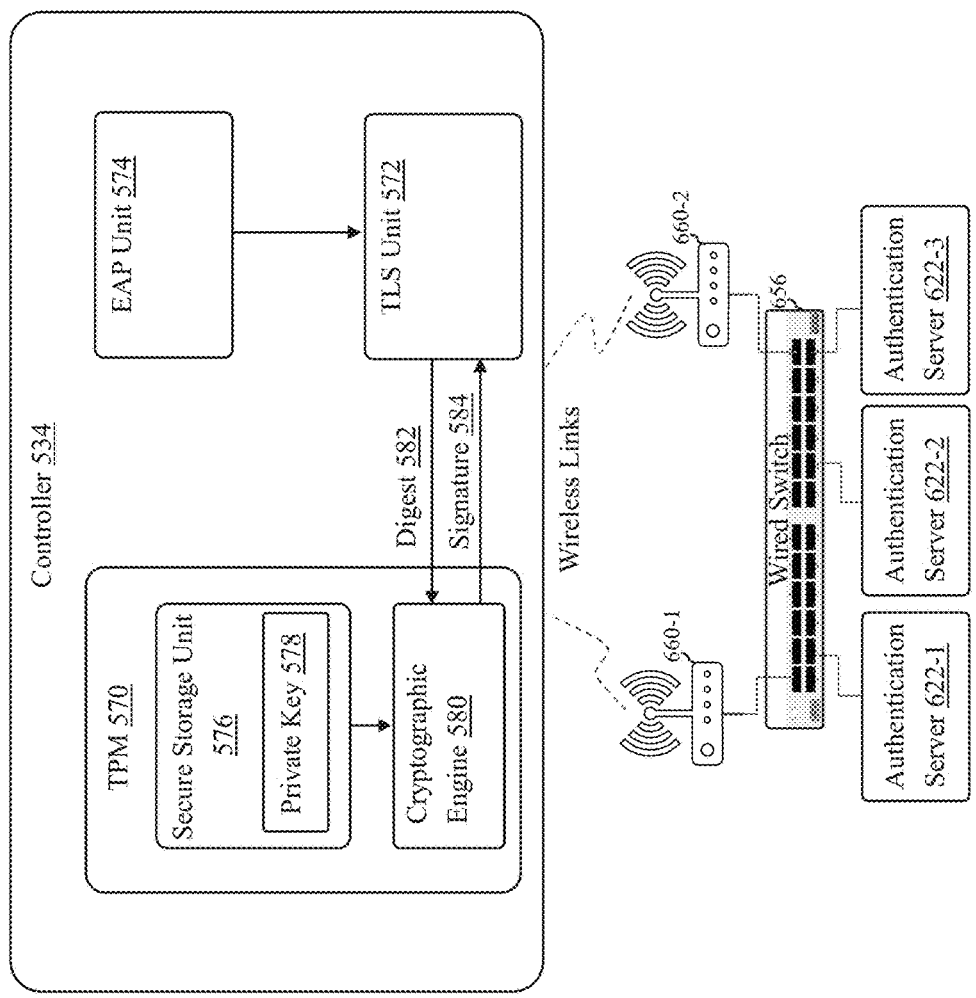
FIG. 6 illustrates an authentication configuration in which that a controller of a wireless sensor interacts with authentication servers through wireless APs and a wired switch.

FIG. 6 illustrates an authentication configuration 600 in which that the controller 534 of a wireless sensor (e.g., the wireless sensor 462) interacts with authentication servers 622-1, 622-2, 622-3 through wireless APs 660-1, 660-2 and a wired switch 656. In the embodiment depicted in FIG. 6, the controller 534 communicates with the wireless APs 660-1, 660-2 through wireless links, while the wireless APs 660-1, 660-2 are connected to the wired switch, which are connected to the authentication servers 622-1, 622-2, 622-3. The authentication servers 622-1, 622-2, 622-3 can either reside on premise (e.g., implemented in the customer site 114 depicted in FIG. 1) or in the cloud (e.g., implemented as or in the cloud server 102 depicted in FIG. 1). In some embodiments, the TLS unit 572 is configured to, based on the private key 578 stored in the secure storage unit 576, perform mutual authentication with the authentication server 622-1, 622-2, or 622-3 using a TLS protocol where a TLS client is the wireless sensor. In some embodiments, the authentication servers 622-1, 622-2, 622-3 are local authentication servers that reside on premise (e.g., implemented as or in the customer site 114 depicted in FIG. 1). In some embodiments, the authentication servers 622-1, 622-2, 622-3 are remote authentication servers that reside in the cloud (e.g., implemented as or in the cloud server 102 depicted in FIG. 1). In some embodiments, the authentication servers 622-1, 622-2, 622-3 includes at least one local authentication server that resides on premise (e.g., implemented as or in the customer site 114 depicted in FIG. 1) and at least one remote authentication server that resides in the cloud (e.g., implemented as or in the cloud server 102 depicted in FIG. 1). The controller authenticates with the authentication servers 622-1, 622-2, 622-3 through the wireless APs 660-1, 660-2 and the wired switch 656. The wireless APs 660-1, 660-2 may be embodiments of the wireless APs 360-1, 360-2, 360-3, 360-4, 360-5, 360-6 depicted in FIG. 3. The authentication servers 622-1, 622-2, 622-3 may be embodiments of the authentication servers 322-1, 322-2 depicted in FIG. 3. The wired switch 656 may be an embodiment of the ASs 356-1, 356-2, 356-3, 356-4, 356-5, 356-6 depicted in FIG. 3. Although the controller 534, the authentication servers 622-1, 622-2, 622-3, the wireless APs 660-1, 660-2, and the wired switch 656 are shown in FIG. 1 as being connected in certain topology, the network topology in which the controller 534, the authentication servers 622-1, 622-2, 622-3, the wireless APs 660-1, 660-2, and the wired switch 656 are connected is not limited to the topology shown in FIG. 1. For example, in some embodiments, at least one of the authentication servers 622-1, 622-2, 622-3 connects to at least one of the wireless APs 660-1, 660-2 directly or wirelessly connects to the wireless sensor (e.g., the wireless sensor 462) that includes the controller 534.

Figure 7:
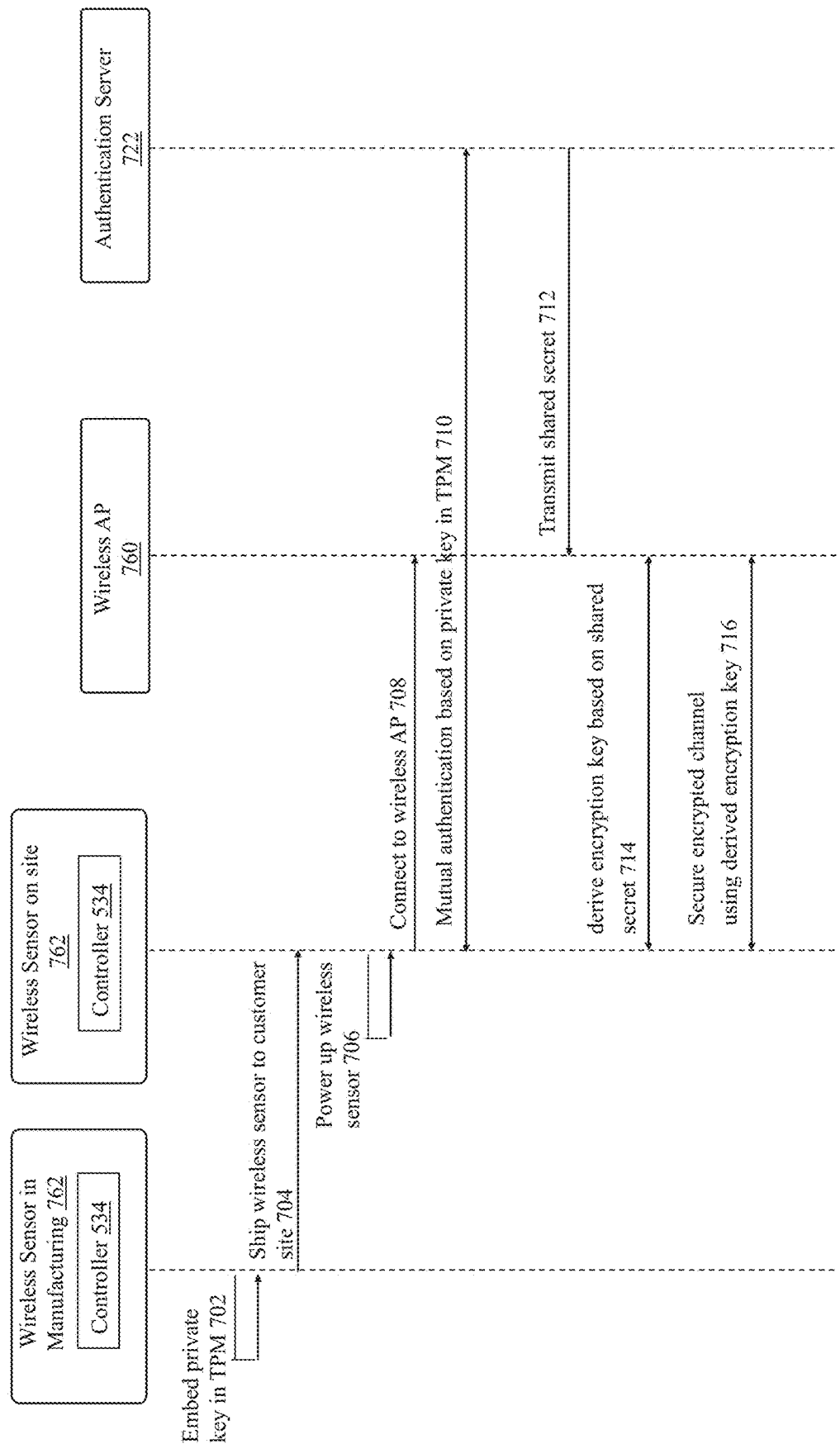
FIG. 7 shows a swim-lane diagram illustrating an example authentication procedure between a wireless sensor, a wireless AP, and an authentication server.

FIG. 7 shows a swim-lane diagram illustrating an example authentication procedure between a wireless sensor 762, a wireless AP 760, and an authentication server 722. In the authentication procedure depicted in FIG. 7, the wireless sensor 762 is shipped from a manufacturer (e.g., a factory) to a customer site (e.g., the customer site 114) needs no further configuration for the wireless sensor to become functional. Because certificate-based authentication is used, there is no need to configure a password or other pre-shared secret on the wireless sensor 762. In addition, because the certificate has the unique identity of the wireless sensor 762, there is no need to provision a unique name into the wireless sensor 762. The wireless sensor 762, which may be an embodiment of the wireless sensor 462 depicted in FIG. 4, includes the controller 534 depicted in FIG. 5. The wireless AP 760 may be an embodiment of the wireless AP 660-1, 660-2 depicted in FIG. 6. The authentication server 722 can either reside on premise (e.g., implemented in the customer site 114 depicted in FIG. 1) or in the cloud (e.g., implemented as or in the cloud server 102 depicted in FIG. 1). The authentication server 722 may be an embodiment of the cloud server depicted in FIG. 1, the authentication servers 322-1, 322-2 depicted in FIG. 3, and/or the authentication servers 622-1, 622-2, 622-3 depicted in FIG. 6. Although operations in the example procedure in FIG. 7 are described in a particular order, in some embodiments, the order of the operations in the example procedure may be altered so that certain operations may be performed in an inverse order or so that certain operations may be performed, at least in part, concurrently with other operations.

In operation 702, in a secure manner during sensor manufacturing, a private key is embedded into the wireless sensor 762 (e.g., into the TPM 570 of the controller 534). In operation 704, the wireless sensor 762 is shipped to a customer site (e.g., the customer site 114). In operation 706, the wireless sensor 762 is powered up. When the wireless sensor 762 is powered up, the wireless sensor 762 runs the software programmed into the wireless sensor 762 during manufacturing. The software looks for a well-known WLAN network name, such as an IEEE 802.11 service set identifier (SSID) that is advertised by wireless APs and establishes a wireless link to the wireless AP 760 in operation 708. At this point, the wireless sensor 762, the authentication server (AS) 722, and the wireless AP 760 exchange messages, for example, in accordance with the 802.1X protocol, in order for the wireless sensor 762 and the authentication server 722 to mutually authenticate themselves. In operation 710, the wireless sensor 762 and the authentication server (AS) 722 perform mutual authentication based on the private key embedded into the wireless sensor 762 (e.g., the private key 578 stored in the TPM 570 of the controller 534).

In operation 712, a shared secret is transmitted from the authentication server 722 to the wireless AP 760. In some embodiments, once mutual authentication procedure between the wireless sensor 762 and the authentication server 722 succeeds, the wireless sensor 762 and the authentication server 722 generate a shared secret as a by-product of successful mutual authentication, which is referred to as the Pre-Master Key (PMK).

In operation 714, an encryption key is derived based on the shared secret. The wireless AP 760 may receive the PMK from the authentication server 722, which is considered secure because the wireless AP 760 and the authentication server 722 are on the same wired network. At this point, the wireless AP 760 and the wireless sensor 762 have the same PMK and engage in an exchange referred to as the 4-way handshake to derive a Pairwise Transient Key (PTK) from the PMK.

In operation 716, the wireless sensor 762 and the wireless AP 760 communicate to each other based on the derived encryption key. In some embodiments, all packets sent between the wireless AP 760 and the wireless sensor 762 are encrypted using the PTK.

Figure 8:
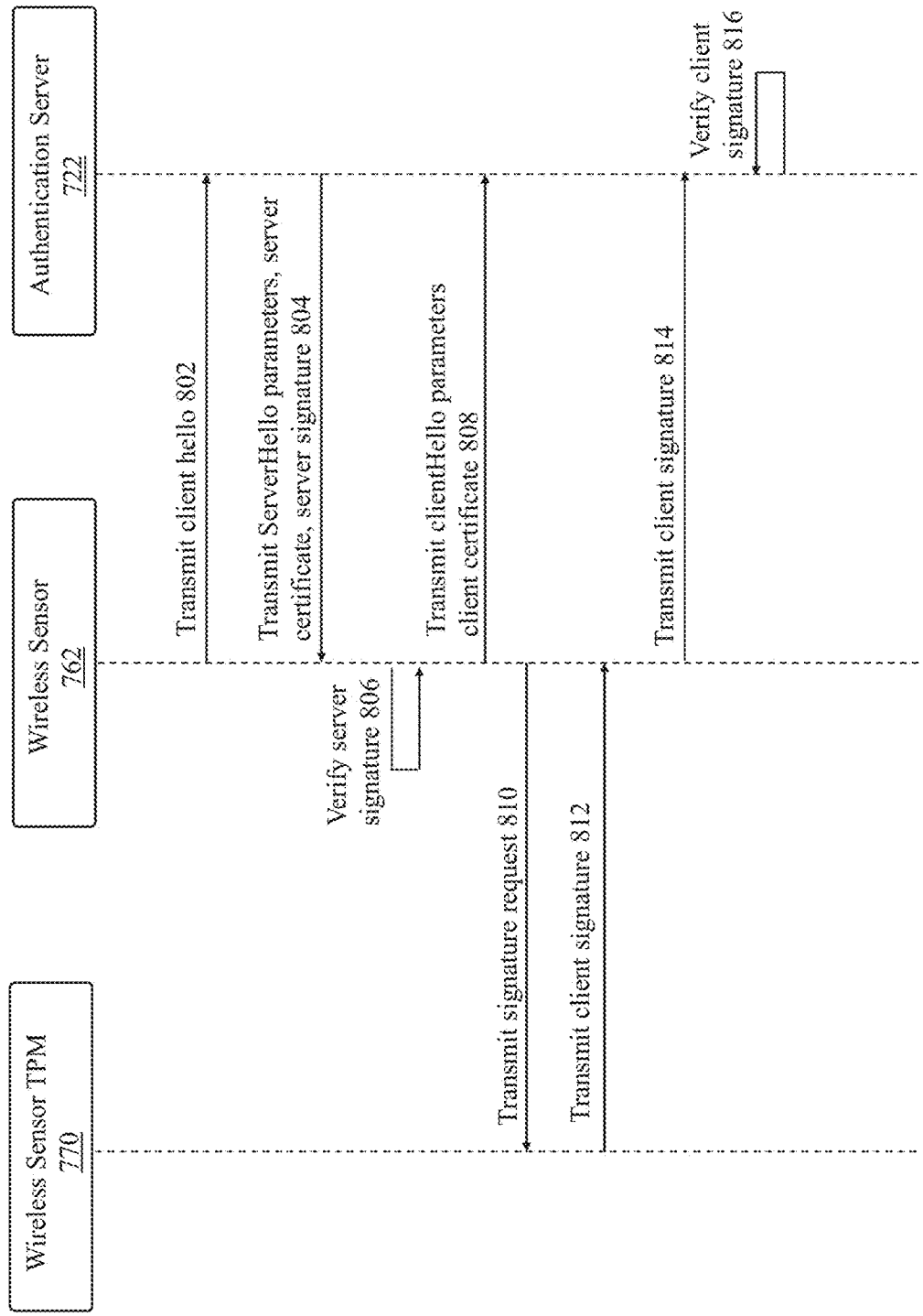
FIG. 8 shows a swim-lane diagram illustrating an example mutual authentication procedure between a wireless sensor and an authentication server.

FIG. 8 shows a swim-lane diagram illustrating an example mutual authentication procedure between the wireless sensor 762 and the authentication server 722. The authentication procedure shown in FIG. 8 correspond to the operation 710 depicted in FIG. 7. In the authentication procedure depicted in FIG. 8, the mutual authentication uses the TLS protocol where the TLS client is the wireless sensor 762. Although operations in the example procedure in FIG. 8 are described in a particular order, in some embodiments, the order of the operations in the example procedure may be altered so that certain operations may be performed in an inverse order or so that certain operations may be performed, at least in part, concurrently with other operations.

In operation 802, the client (i.e., the wireless sensor 762 (e.g., the TLS unit 572)) transmits or sends a "Client Hello" message with parameters that indicate its preferences such as supported cipher suites to the authentication server 722. In operation 804, the authentication server 722 transmits or responds with its parameters, a server certificate, and a server signature. In operation 806, the client (i.e., the wireless sensor 762 (e.g., the TLS unit 572 or the cryptographic engine 580)) verifies the server signature using the server certificate. If the verification succeeds, the client (i.e., the wireless sensor 762) transmits or sends its client certificate along with the client signature. Specifically, in operation 808, the client (i.e., the wireless sensor 762 (e.g., the TLS unit 572)) transmits or sends "Client Hello" parameters and the client certificate to the authentication server 722. The client signature is typically obtained by computing a digest of all the messages that the client has sent and generating a signature of the digest using the private key of the client. This signature operation is performed by a wireless sensor TPM 770, which may be an embodiment of the TPM 570 of the controller 534 depicted in FIG. 5, because only the wireless sensor TPM 770 has the private key (e.g., the private key 578 being stored in a secure storage unit 576 of the TPM 570). In operation 810, the client (i.e., the wireless sensor 762 (e.g., the TLS unit 572)) transmits a signature request to the wireless sensor TPM 770 (e.g., the cryptographic engine 580). In operation 812, the wireless sensor TPM 770 (e.g., the cryptographic engine 580) transmits or responds with the client signature to the client (i.e., the wireless sensor 762 (e.g., the TLS unit 572)). In operation

814, the client (i.e., the wireless sensor 762 (e.g., the TLS unit 572)) transmits the client signature to the authentication server 722. The authentication server 722 verifies the client signature sent by the client (i.e., the wireless sensor 762 (e.g., the TLS unit 572)) in operation 816. If the client signature is verified correctly, the mutual authentication is successful.

In some embodiments, once mutual authentication procedure between the wireless sensor 762 and the authentication server 722 succeeds, the wireless sensor 762 and the authentication server 722 generate a shared secret as a by-product of successful mutual authentication, which is referred to as the PMK. The wireless AP 760 needs to obtain the PMK such that the wireless AP 760 and the wireless sensor 762 can engage in another round of communication to derive an encryption key called the PTK. If the PTK is generated successfully, the wireless sensor 762 has the assurance that it is talking to an authorized AP. In some embodiments, all packets sent between the wireless AP 760 and the wireless sensor 762 are encrypted using the PTK. The wireless AP 760 may receive the PMK from the authentication server 722, which is considered secure because the wireless AP 760 and the authentication server 722 are on the same wired network. At this point, the wireless AP 760 and the wireless sensor 762 have the same PMK and engage in an exchange referred to as the 4-way handshake. The purpose of this handshake is to derive the PTK from the PMK. Subsequently, the PTK can be used to encrypt all the traffic between the wireless AP 760 and the wireless sensor 762. The operations described above correspond to the operations 712, 714, 716 depicted in FIG. 7.

Figure 9:
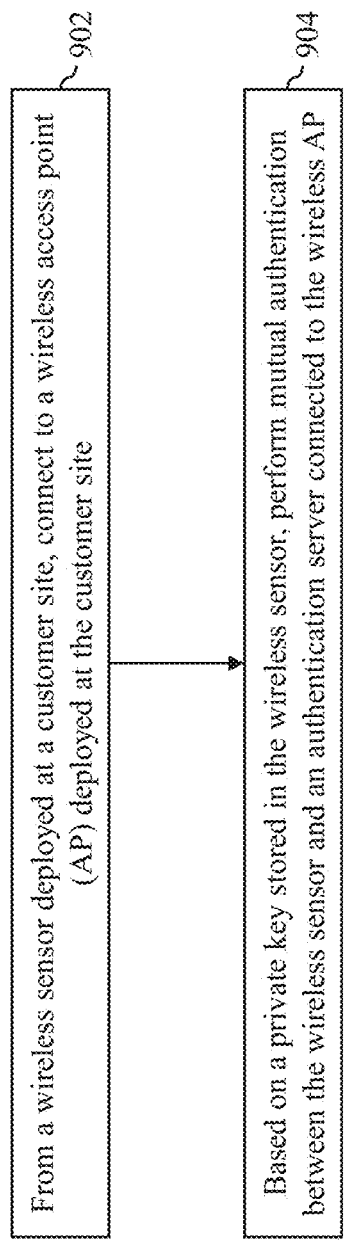
FIG. 9 is a process flow diagram of a method of communications in accordance to an embodiment of the invention.

FIG. 9 is a process flow diagram of a method of communications in accordance to an embodiment of the invention. According to the method, at block 902, from a wireless sensor deployed at a customer site, a wireless access point (AP) deployed at the customer site is connected to. At block 904, based on a private key stored in the wireless sensor, mutual authentication between the wireless sensor and an authentication server connected to the wireless AP is performed. In some embodiments, an encryption key for communications between the wireless sensor and the wireless AP is derived in response to the mutual authentication. In some embodiments, at the wireless sensor deployed at the customer site, wireless communications are conducted with the wireless AP using the encryption key. In some embodiments, the encryption key for communications between the wireless sensor and the wireless AP is derived in response to a shared secret generated as a result of the mutual authentication. In some embodiments, the shared secret is transmitted from the authentication server to the wireless AP. In some embodiments, the shared secret includes a Pre-Master Key (PMK). In some embodiments, the encryption key includes a Pairwise Transient Key (PTK). In some embodiments, the private key is stored in a Trusted Platform Module (TPM) of the wireless sensor. In some embodiments, based on the private key stored in the wireless sensor, the mutual authentication between the wireless sensor and the authentication server connected to the wireless AP is performed using a Transport Layer Security (TLS) protocol where a TLS client is the wireless sensor. In some embodiments, a server certificate, a server signature, a client certificate, and a client signature are exchanged between the wireless sensor and the authentication server. In some embodiments, from the wireless sensor, a client message is transmitted to the authentication server, at the wireless sensor, a server message, a server certificate, and a server signature are received from the authentication server in response to the client message, at the wireless sensor, the server signature is verified, and from the wireless sensor, a client certificate is transmitted to the authentication server when the server signature is successfully verified. In some embodiments, a signature request is transmitted to a Trusted Platform Module (TPM) of the wireless sensor in which the private key is stored, and a client signature is received from the TPM of the wireless sensor, wherein the client signature is generated based on the private key. In some embodiments, from the wireless sensor, the client signature is transmitted to the authentication server, and at the authentication server, the client signature is verified. The wireless sensor may be similar to, the same as, or a component of the wireless sensors 362-1, 362-2, 362-3 depicted in FIG. 3, the wireless sensor 462 depicted in FIG. 4, and/or the wireless sensor 762 depicted in FIGS. 7 and 8. The customer site may be similar to, the same as, or a component of the customer site 114 depicted in FIG. 1. The wireless AP may be similar to, the same as, or a component of the wireless APs 360-1, 360-2, 360-3, 360-4, 360-5, 360-6 depicted in FIG. 3, the wireless APs 660-1, 660-2 depicted in FIG. 6, and/or the wireless AP 760 depicted in FIGS. 7 and 8. The authentication server may be similar to, the same as, or a component of the authentication servers 322-1, 322-2 depicted in FIG. 3, the authentication servers 622-1, 622-2, 622-3 depicted in FIG. 6, and/or the authentication server 722 depicted in FIGS. 7 and 8.

Figure 10:
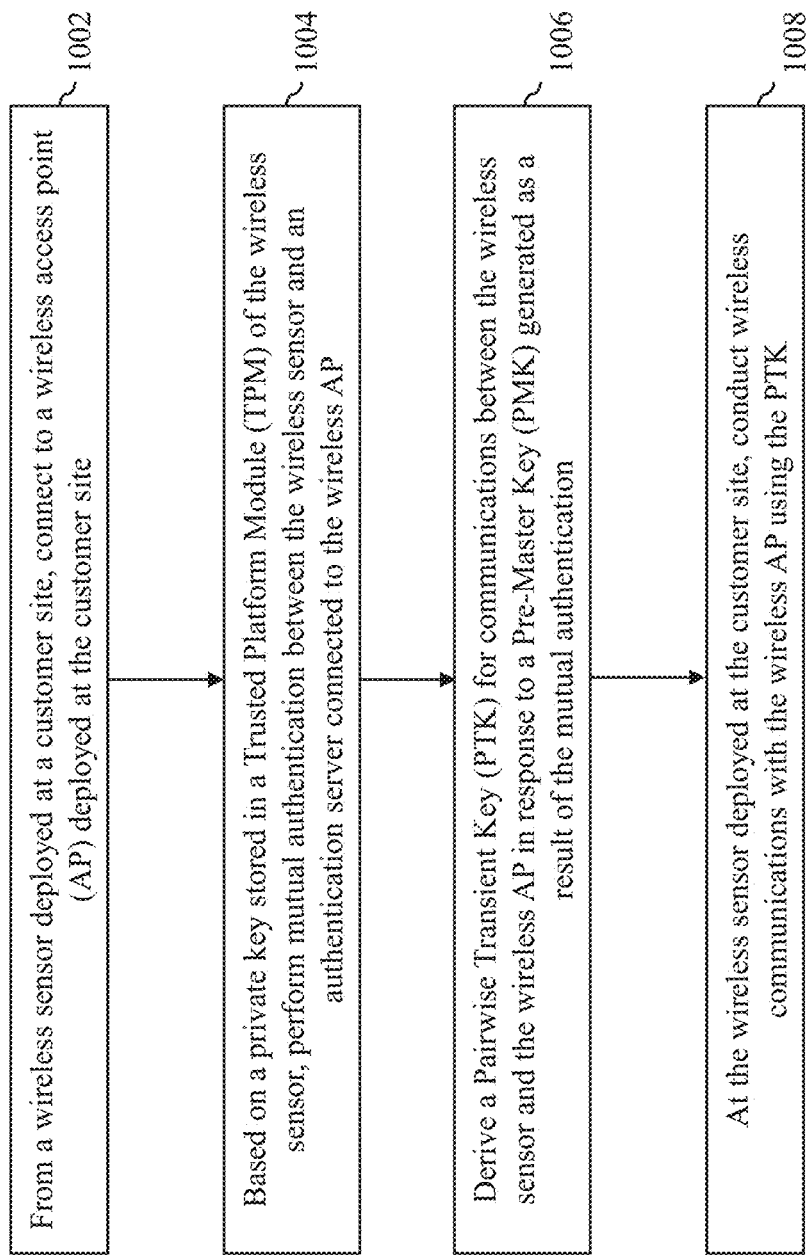
FIG. 10 is a process flow diagram of a method of communications in accordance to an embodiment of the invention.

FIG. 10 is a process flow diagram of a method of communications in accordance to an embodiment of the invention. According to the method, at block 1002, from a wireless sensor deployed at a customer site, a wireless access point (AP) deployed at the customer site is connected to. At block 1004, based on a private key stored in a Trusted Platform Module (TPM) of the wireless sensor, mutual authentication between the wireless sensor and an authentication server connected to the wireless AP is performed. At block 1006, a Pairwise Transient Key (PTK) for communications between the wireless sensor and the wireless AP is derived in response to a Pre-Master Key (PMK) generated as a result of the mutual authentication. At block 1008, at the wireless sensor deployed at the customer site, wireless communications are conducted with the wireless AP using the PTK. The wireless sensor may be similar to, the same as, or a component of the wireless sensors 362-1, 362-2, 362-3 depicted in FIG. 3, the wireless sensor 462 depicted in FIG. 4, and/or the wireless sensor 762 depicted in FIGS. 7 and 8. The customer site may be similar to, the same as, or a component of the customer site 114 depicted in FIG. 1. The wireless AP may be similar to, the same as, or a component of the wireless APs 360-1, 360-2, 360-3, 360-4, 360-5, 360-6 depicted in FIG. 3, the wireless APs 660-1, 660-2 depicted in FIG. 6, and/or the wireless AP 760 depicted in FIGS. 7 and 8. The authentication server may be similar to, the same as, or a component of the authentication servers 322-1, 322-2 depicted in FIG. 3, the authentication servers 622-1, 622-2, 622-3 depicted in FIG. 6, and/or the authentication server 722 depicted in FIGS. 7 and 8.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of communications, the method comprising:
   from a wireless sensor deployed at a customer site, connecting to a wireless access point (AP) deployed at the customer site; and
   based on a client signature that is generated using a private key stored in a Trusted Platform Module (TPM) of the wireless sensor, performing mutual authentication between the wireless sensor and an authentication server connected to the wireless AP, wherein based on the client signature that is generated using the private key stored in the TPM of the wireless sensor, performing the mutual authentication between the wireless sensor and the authentication server connected to the wireless AP comprises exchanging a server message, a server certificate, a server signature, a client message, a client certificate, and the client signature between the wireless sensor and the authentication server using a Transport Layer Security (TLS) protocol where a TLS client is the wireless sensor.

2. The method of claim 1, further comprising deriving an encryption key for communications between the wireless sensor and the wireless AP in response to the mutual authentication.

3. The method of claim 2, further comprising at the wireless sensor deployed at the customer site, conducting wireless communications with the wireless AP using the encryption key.

4. The method of claim 2, wherein deriving the encryption key for communications between the wireless sensor and the wireless AP in response to the mutual authentication comprises deriving the encryption key for communications between the wireless sensor and the wireless AP in response to a shared secret generated as a result of the mutual authentication.

5. The method of claim 4, further comprising transmitting the shared secret from the authentication server to the wireless AP.

6. The method of claim 4, wherein the shared secret comprises a Pre-Master Key (PMK).

7. The method of claim 4, wherein the encryption key comprises a Pairwise Transient Key (PTK).

8. The method of claim 1, wherein based on the client signature that is generated using the private key stored in the TPM of the wireless sensor, performing the mutual authentication between the wireless sensor and the authentication server connected to the wireless AP comprises:
   from the wireless sensor, transmitting the client message to the authentication server;
   at the wireless sensor, receiving the server message, the server certificate, and the server signature from the authentication server in response to the client message;
   at the wireless sensor, verifying the server signature; and
   from the wireless sensor, transmitting the client certificate to the authentication server when the server signature is successfully verified.

9. A wireless sensor deployed at a customer site, the wireless sensor comprising:
   a wireless transceiver configured to connect to a wireless access point (AP) deployed at the customer site; and
   a controller comprising a Trusted Platform Module (TPM) configured to store a private key and configured to, based on a client signature that is generated using the private key stored in the TPM, perform mutual authentication with an authentication server connected to the wireless AP by exchanging a server message, a server certificate, a server signature, a client message, a client certificate, and the client signature between the wireless sensor and the authentication server using a Transport Layer Security (TLS) protocol where a TLS client is the wireless sensor,
   wherein the wireless transceiver and the controller are implemented using at least one processor.

10. The wireless sensor of claim 9, wherein the controller is further configured to derive an encryption key for communications between the wireless sensor and the wireless AP in response to the mutual authentication.

11. The wireless sensor of claim 10, wherein the controller is further configured to conduct wireless communications with the wireless AP using the encryption key.

12. The wireless sensor of claim 10, wherein the controller is further configured to derive the encryption key for communications between the wireless sensor and the wireless AP in response to a shared secret generated as a result of the mutual authentication.

13. The wireless sensor of claim 12, wherein the shared secret comprises a Pre-Master Key (PMK).

14. The wireless sensor of claim 9, wherein the encryption key comprises a Pairwise Transient Key (PTK).

15. The wireless sensor of claim 9, wherein the controller is further configured to transmit the client certificate to the authentication server when the server signature from the authentication server is successfully verified.

16. The wireless sensor of claim 9, wherein the controller comprises a cryptographic engine configured to receive a message digest and generate the client signature of the message digest based on the private key.

17. A method of communications, the method comprising:
   from a wireless sensor deployed at a customer site, connecting to a wireless access point (AP) deployed at the customer site;
   based on a client signature that is generated using a private key stored in a Trusted Platform Module (TPM) of the wireless sensor, performing mutual authentication between the wireless sensor and an authentication server connected to the wireless AP, wherein based on the client signature that is generated using the private key stored in the TPM of the wireless sensor, performing the mutual authentication between the wireless sensor and the authentication server connected to the wireless AP comprises exchanging a server message, a server certificate, a server signature, a client message, a client certificate, and the client signature between the wireless sensor and the authentication server using a Transport Layer Security (TLS) protocol where a TLS client is the wireless sensor;

deriving a Pairwise Transient Key (PTK) for communications between the wireless sensor and the wireless AP in response to a Pre-Master Key (PMK) generated as a result of the mutual authentication; and at the wireless sensor deployed at the customer site, conducting wireless communications with the wireless AP using the PTK.

\* \* \* \* \*